United States Patent
Kirchhoffer

(10) Patent No.: US 9,157,491 B2
(45) Date of Patent: Oct. 13, 2015

(54) DUAL CLUTCH TRANSMISSION

(71) Applicant: FORD GLOBAL TECHNOLOGIES, LLC, Dearborn, MI (US)

(72) Inventor: Johann Kirchhoffer, Köln (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 75 days.

(21) Appl. No.: 13/944,985

(22) Filed: Jul. 18, 2013

(65) Prior Publication Data
US 2014/0048373 A1 Feb. 20, 2014

(30) Foreign Application Priority Data
Aug. 16, 2012 (DE) .......................... 10 2012 214 591

(51) Int. Cl.
| F16D 21/02 | (2006.01) |
| F16D 3/06 | (2006.01) |
| F16D 3/12 | (2006.01) |
| F16D 3/14 | (2006.01) |
| F16D 21/06 | (2006.01) |

(52) U.S. Cl.
CPC F16D 21/02 (2013.01); F16D 3/06 (2013.01); F16D 3/12 (2013.01); F16D 3/14 (2013.01); F16D 21/06 (2013.01); F16D 2021/0615 (2013.01); F16D 2300/22 (2013.01)

(58) Field of Classification Search
CPC ........... F16D 21/02; F16D 21/06; F16D 3/14; F16D 3/12; F16D 3/06; F16D 2021/0615; F16D 2300/22
See application file for complete search history.

(56) References Cited

U.S. PATENT DOCUMENTS

| 8,336,689 | B2 * | 12/2012 | Guild et al. ................. | 192/30 V |
| 2005/0252749 | A1 * | 11/2005 | Janson .......................... | 192/212 |
| 2007/0125148 | A1 * | 6/2007 | Dohmann et al. .............. | 72/352 |
| 2009/0283380 | A1 * | 11/2009 | Kimmig ....................... | 192/48.1 |
| 2009/0288926 | A1 * | 11/2009 | Reimnitz ...................... | 192/48.1 |
| 2011/0120831 | A1 | 5/2011 | Thibaut et al. | |
| 2011/0214532 | A1 * | 9/2011 | Kirchner ..................... | 74/665 A |
| 2013/0153356 | A1 * | 6/2013 | Fleischmann et al. ....... | 192/48.9 |

FOREIGN PATENT DOCUMENTS

| DE | 112006003467 T5 | 11/2008 |
| DE | 102009042071 A1 | 4/2010 |
| FR | 2919696 A1 | 2/2009 |
| WO | 2008064648 A1 | 6/2008 |
| WO | 2011137889 A1 | 11/2011 |

* cited by examiner

*Primary Examiner* — David J Hlavka
(74) *Attorney, Agent, or Firm* — James Dottavio; MacMillan, Sobanski & Todd, LLC

(57) ABSTRACT

A dual clutch transmission for motor vehicles, with two sub-transmissions, with a dual clutch, with a central disk (3) connected to the driving disk (2) and belonging to the dual clutch, with two outer pressure plates (4, 5) and with friction disks (6, 7) which are arranged between the central disk (3) and the pressure plates (4, 5) and which can be coupled individually to the central disk (3) and transfer the torque selectively to the sub transmissions via one of the clutch output shafts (solid shaft 10, hollow shaft 11). Dual clutch transmissions often suffer from noise and vibration problems which mostly arise during crawling actions, when starting from a standstill, in load alternation processes and during gear changes. In order to avoid this, the central disk (3) is decoupled from the driving disk (2) and is mounted on the hollow shaft (11); furthermore, the central disk (3) is connected cardanically to the driving disk (2).

25 Claims, 17 Drawing Sheets

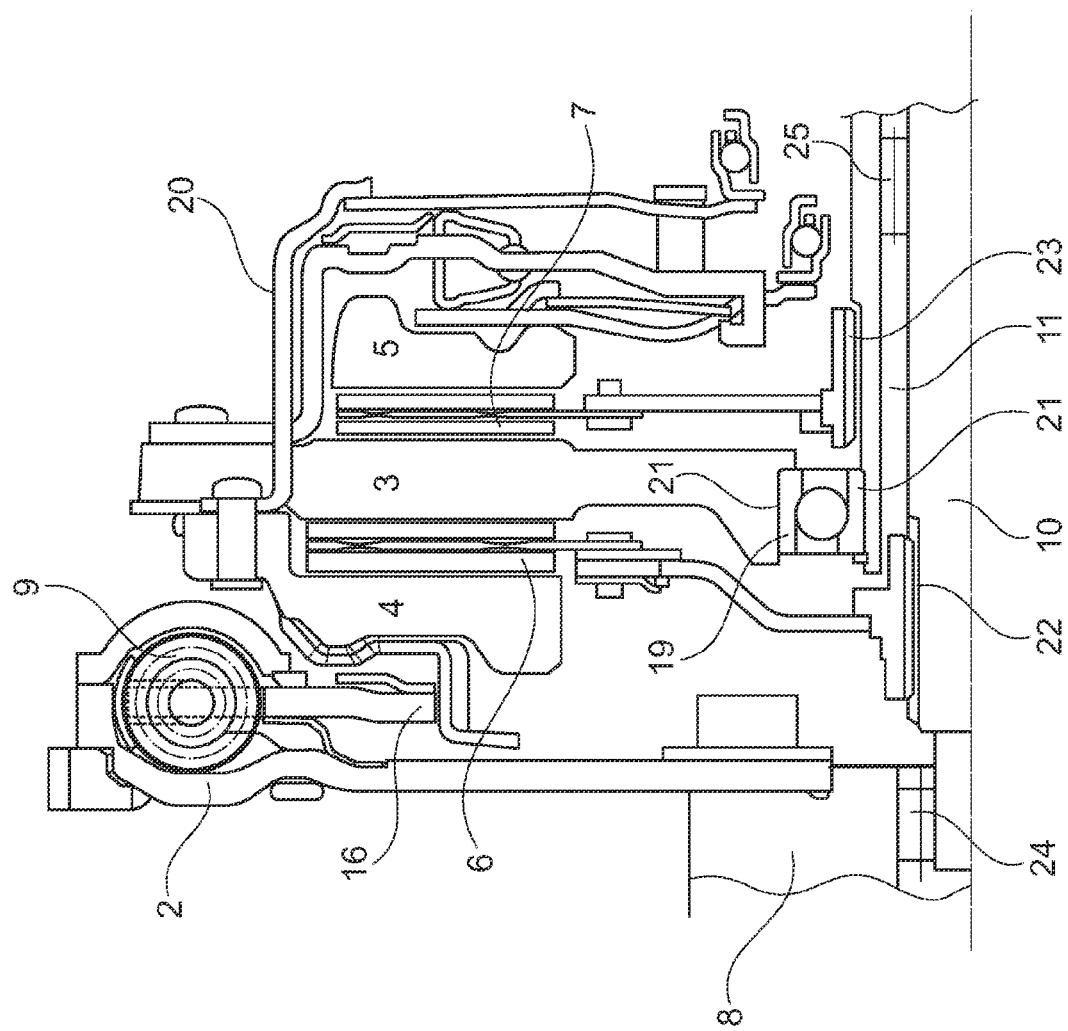

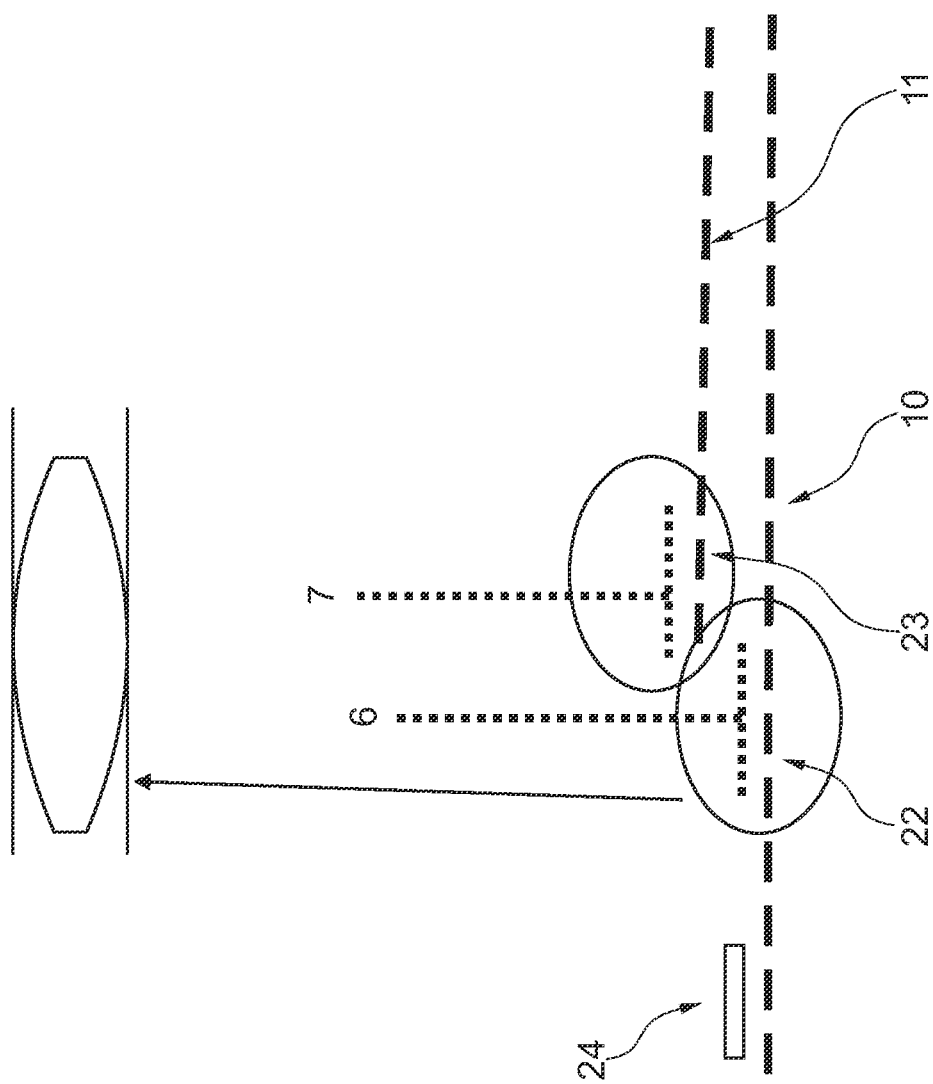

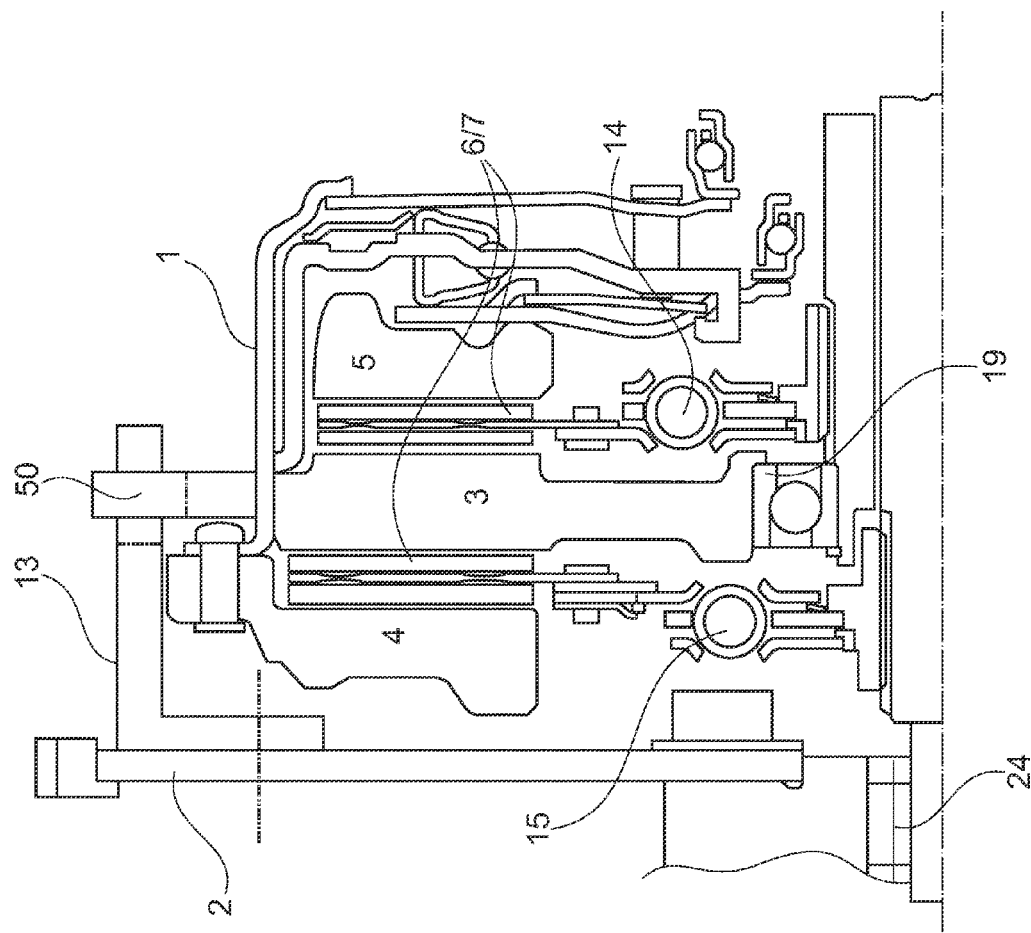

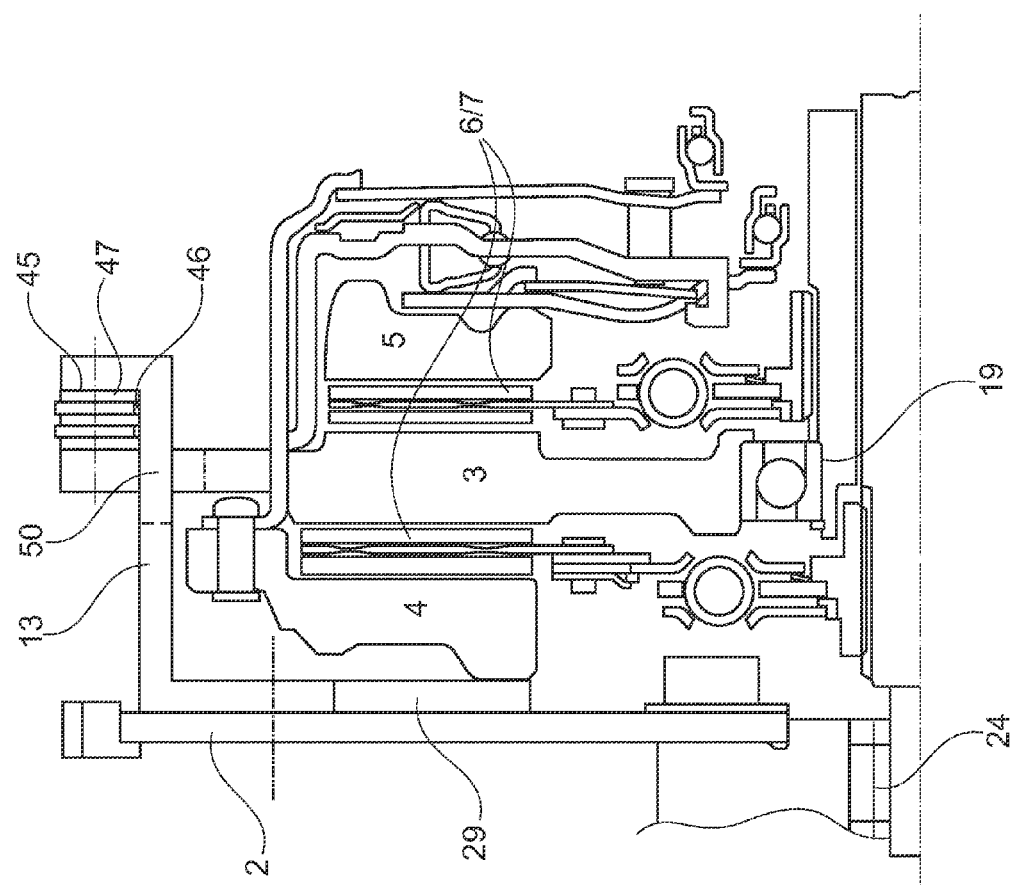

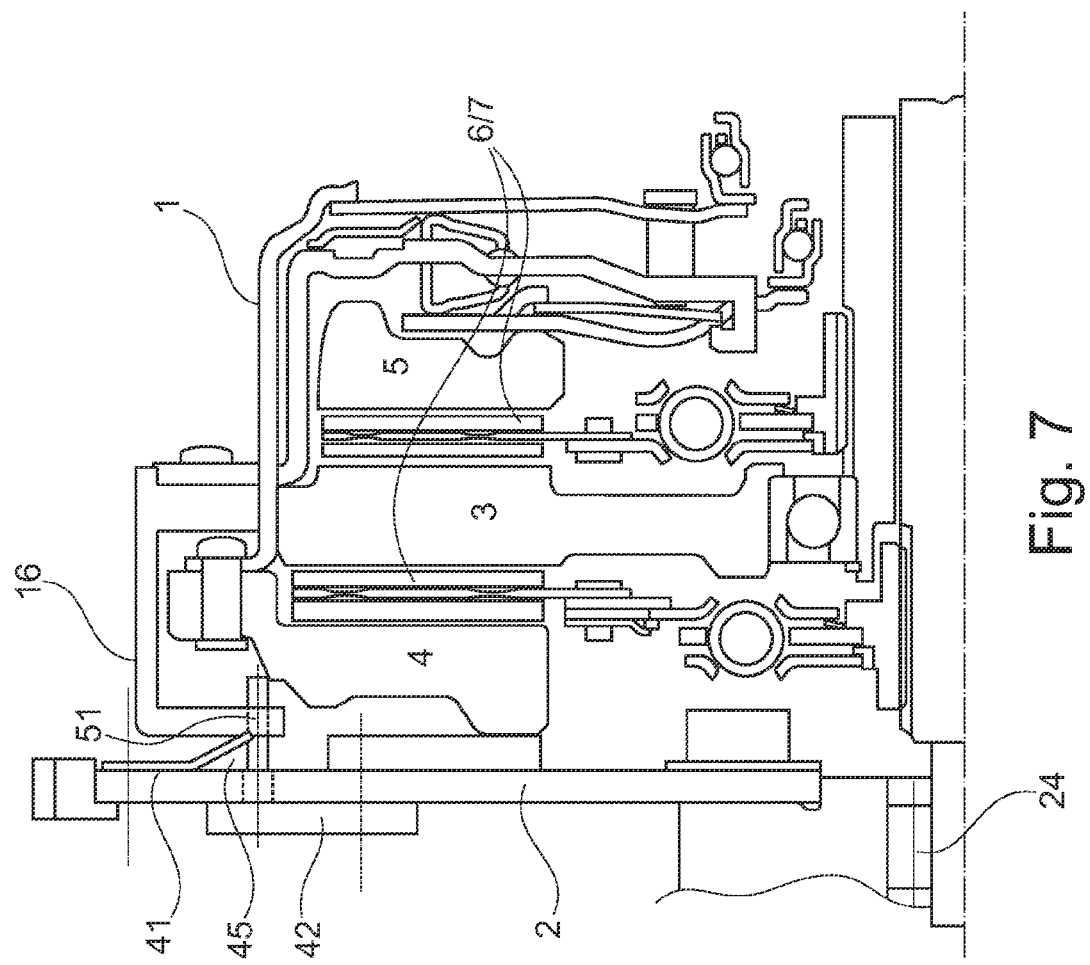

DUAL CLUTCH TRANSMISSION

CROSS REFERENCE TO RELATED APPLICATIONS

This application claims priority to application DE 10 2012 214591.5, filed in the German Patent and Trademark Office on Aug. 16, 2012, the entire disclosure of which is hereby incorporated by reference.

BACKGROUND OF THE INVENTION

1. Field of the Invention

The invention relates to a dual clutch transmission for motor vehicles, having with two subtransmissions

2. Description of the Prior Art

Dual clutch transmissions are automatic shift transmissions which make it possible by means of two subtransmissions to carry out a fully automatic gear change without any interruption in force. The transmission control selects the gears automatically or according to the driver's wish within the framework of the permitted rotational speed ranges. The transfer of the torque takes place via one of the two clutches which connect the two subtransmissions to the engine. While one clutch closes, the other opens.

Particularly when such dual clutch transmissions are provided with a dry dual clutch, they often produce noise and vibration which arise mostly during crawling actions, when starting from a standstill, in load alternation processes and during gear changes. The main problems here are gear rattling, clutch grab during starting and the occurrence of shift shocks during gear changes. The causes of the problems listed are set out below:

A first problem, which occurs particularly in the case of dry dual clutches, is what is known as clutch fading which is partial or even complete clutch surface overheating which makes it impossible to control the clutch friction coefficient via the clutch slip. During the overheating phase of the clutch, clutch fading mostly results in a reduction in the friction coefficient and then, after clutch cooling, in an increase in the friction coefficient. Fluctuations in the friction coefficient also arise which may lead to shift shocks, shift slip and clutch grab during crawling or starting. The occurrence of clutch fading is mostly to be found in clutches which are not yet run in. The cause is usually geometric errors in the overall clutch system and its surroundings, with the result that insufficient contact surfaces between the friction disk, pressure plate and central disk may occur, so that the locally limited contact surfaces partially overheat.

A second problem is what is known as geometric grab caused by geometric clutch errors. This leads not only to torque irregularities or non-uniformities in the clutch parts and therefore to clutch grab during starting, but, as an effect, also to vehicle vibrations which are transferred from the clutch into the transmission housing and thus, via the engine and transmission suspension, into the passenger cell.

A third problem is unstable slip control which is likewise caused by geometric clutch errors. Short-circuiting of the engine side with the transmission side of the clutch may consequently occur, so that the torsional non-uniformities originating from the engine may lead to gear rattling.

A fourth problem is that where a clutch wobbles on the input shafts, with the result that the bearing clearances are enlarged, and therefore bearing damage may occur. By these geometric errors being generated, not only may noise and vibration nuisances arise, but there may even be a complete failure of the clutch via clutch contact and the overheating resulting from this.

A fifth problem arises while the clutch is being mounted on the driving disk. In this case, the clutch has to be lifted and pressed radially together with the driving disk. The clutch body must at the same time bear against the driving disk at right angles. This operation often leads to mounting errors and to a resulting oblique position of the clutch or to a situation where the clutch is not lifted or is askew. The consequence is a central plate which oscillates in the x/y/z direction which, in turn, triggers torque nonuniformities on the clutch. This may lead to the three causes of noise nuisance mentioned above.

A sixth problem arises due to the radial clutch torque modulation which occurs on account of torsional fluctuations in the friction coefficient and is transferred via a radial and axial component into the clutch output shafts and therefore into the transmission input shafts. If the pressure force of the corresponding clutch parts is lower than the axial force component, axial characteristic frequency excitations of the affected individual systems may occur, thus leading, in turn, to noise nuisances.

A seventh problem arises due to radial and axial excitation of the central plate when the overall pressure force of the clutches is minimal. This excitation may be an internal geometric clutch error or it may also be caused by the axial and radial torsional nonuniformities of the engine. This then leads, in turn, to axial clutch oscillation, which may give rise, in turn, to a transmission noise problem.

The abovementioned seven problems are usually the consequential effect of an oblique position and/or radial offset of the friction disks with respect to the pressure plates and the central disk. These are geometric errors which are caused by manufacturing inaccuracies and/or system errors, but may also be induced by errors in mounting the clutch itself.

With regard to the prior art, reference is made to DE 10 2005 037 514 A1 and to U.S. Pat. No. 6,830,140 B2 which relate to generic dual clutch transmissions in which the abovementioned problems arise.

SUMMARY OF THE INVENTION

In the dual clutch transmission the central disk is decoupled from the driving disk and is mounted on the hollow shaft, and the central disk is connected cardanically to the driving disk.

By the central disk being decoupled from the driving disk and by the cardanic or pendulous tie-up of the central disk in relation to the driving disk and due to the mounting of the central disk on the clutch output shaft, a uniform and smooth transfer of force from the engine shaft via the driving disk to the central disk is made possible, so that even manufacturing inaccuracies and installation errors in the transmission and engine can be effectively compensated. The precondition for this is that a torque transfer system is installed between the driving disk and the central disk and introduces or enables axial and radial movement compensation and at the same time damping between the driving disk and the central disk.

A damper system is preferably provided in each case between the friction disks and the respective clutch output shaft.

The mounting of the central disk on the clutch output shaft is such that said central disk:
is mounted radially so as to be as play-free and friction-free as possible, is always prestressed axially against the clutch output shaft, is mounted axially so as to be as friction-free as possible.

This is implemented, for the transmission variants with cardanic mounting of the central disk, by introducing an axial needle bearing and by "prestressed installation" of the central disk, for example via a leaf spring system, against the clutch output shaft via an annular disk. In the transmission variants with the mounting of the central disk on the clutch output shaft, the "prestressed installation" may be implemented either via the driving disk/central disk and/or via axially prestressed radial rings.

Optionally, the clutch bearing may be designed as a barrel bearing or needle bearing for the purpose of axial stability. Wobbling of the central disk is consequently prevented.

The clutch bearing and/or the central disk are, if necessary, held axially so as to be prestressed axially via the two radial rings. The spring-prestressed radial rings are seated in each case on the clutch output shaft and/or on the outer ring of the clutch bearing.

To suppress axial and radial movement nonuniformities between the driving disk and the central disk, a spring system, for example a leaf spring system, arranged between these, in combination with a radial damping system, may be provided.

The spring system is expediently prestressed axially. This design is suitable especially when a toothed connection is provided between the driving disk and the central disk. Damping takes place axially as a result of the axial prestress and radially as a result of the radially prestressed friction system. Noise is consequently prevented from being generated in this region.

If the central disk is supported on one of the clutch output shafts via a clutch bearing, a cardanic articulation arranged between the central disk and the clutch bearing may be provided for the compensation of radial nonuniformities between the driving disk and the central disk.

If the friction disks are connected to the clutch output shafts in each case via a serration, various compensating elements may be provided.

It is in this case possible to arrange a flexible disk in each case between the friction disks and the serrations.

Alternatively, a cardanic connection may also be provided between the friction disks and the serrations.

Finally, it is also possible to design the serrations so as to be of crowned form in the axial direction of the tooth tips.

By virtue of these measures, torque nonuniformities and manufacturing inaccuracies can be compensated in the same way and transfer to the clutch output shafts can be damped.

In addition to the measures mentioned, it is also possible to attach a pilot bearing between the input shaft coming from the engine and one of the clutch output shafts. This has the effect that the clutch output shafts are set straight with respect to the engine shaft, so that optimal parallelism between the disks belonging to the clutch can be achieved. This is advantageous for transmission applications in which the central disk is mounted on the clutch output shaft either cardanically or fixedly.

In order to improve slip-controlled insulation via the clutch, the invention proposes a first damping system or first damper stage which is connected fixedly to the driving disk or which is integrated in the driving disk and is positioned between the driving disk and the central disk, the central disk being mounted on the clutch output shaft and a second damper stage being provided with a damper clutch 1 and/or damper clutch 2 between the friction disks and the clutch output shafts.

This clutch architecture requires that a cardanic connection system with axial prestress and radial damping be installed between the driving disk and the central plate, as is described here in this invention. If the central disk is connected fixedly to the driving disk, this cardanic connection system is not necessary.

The advantage of this is that two-stage or multistage damping systems can also be used as a backup to slip control. The damping systems may be employed as energy accumulators or via energy absorption or as energy absorbers. What is critical here is that the amplitudes of the torsional nonuniformities of the engine upstream of the clutch are reduced. The damping system employed acts and functions here as a backup to the clutch slip for overall insulation.

The overall damping for a respective drive train is composed as follows:

1) of the first damper stage upstream of the central plate (no clutch slip) plus the second damper stage connected in series downstream of the friction disk,
2) of the first damper stage upstream of the central plate (with clutch slip), the second damper stage then being partially uncoupled, likewise connected in series.

In this case, the first damper stage and the second damper stage may also be of two-stage design, and the first damper stage may also be designed as a single-mass or two-mass flywheel, thus giving rise to a three-mass damping system or a damping system with two/three or four stages.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 2a shows the same section through a second exemplary embodiment of a dual clutch with a pilot bearing, FIG. 5 shows a diagrammatic illustration of a serration of crowned or spherical type between the friction disks and the clutch output shafts, FIG. 6a shows a section through a dual clutch with a pilot bearing and with mounting of the central disk on one of the clutch output shafts without an axial prestressing system, FIG. 6d shows a section through a dual clutch with a pilot bearing and with mounting of the central disk on one of the clutch output shafts, as in FIG. 6a, combined with a third axially prestressed connection system having axial play compensation and radial damping and at the same time prestressing of the central plate in the engine direction, FIG. 7 shows the same section through a similar embodiment of a dual clutch with a pilot bearing and with mounting of the central disk on a clutch output shaft, combined with a fifth axially prestressed connection system having axial play compensation and radial damping and at the same time prestressing of the central plate in the transmission direction.

DESCRIPTION OF THE PREFERRED EMBODIMENT

Figure 1:
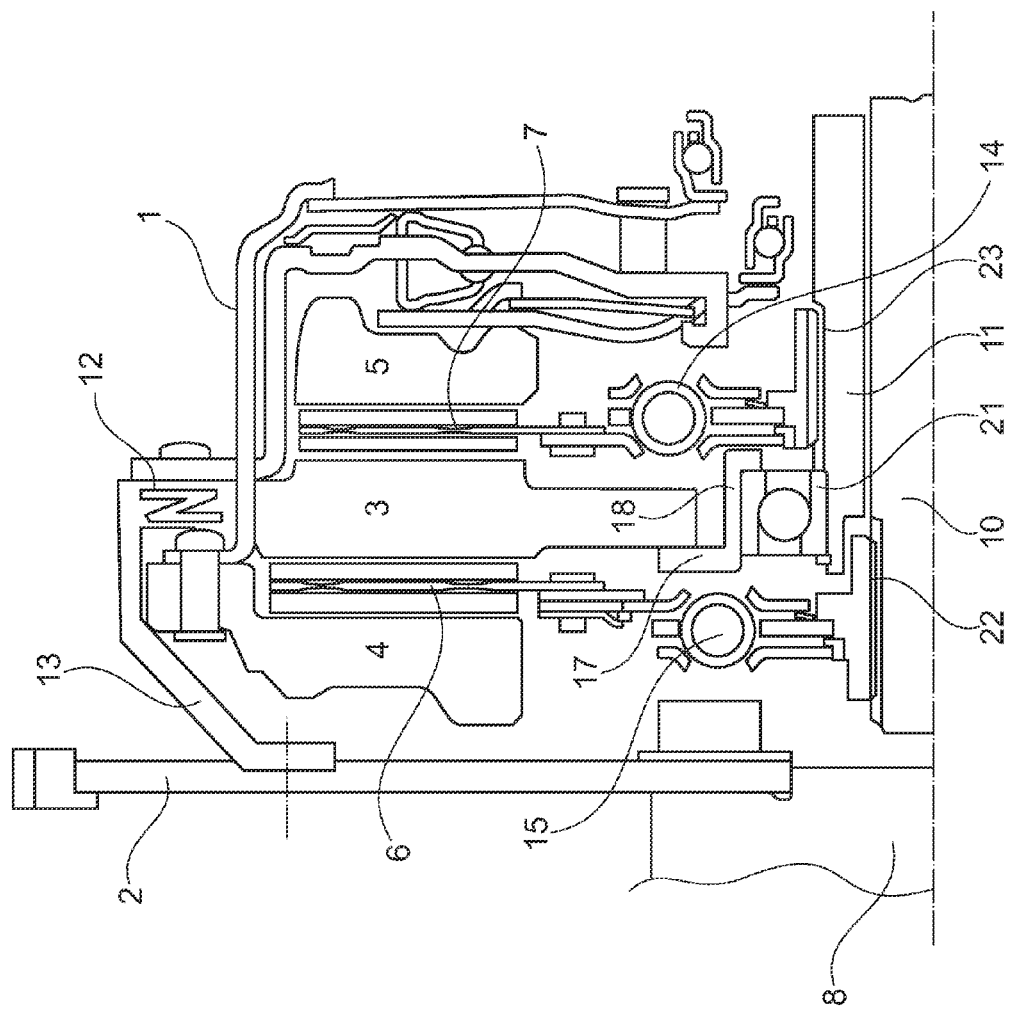
FIG. 1 shows a section through the upper part of a first exemplary embodiment of a dual clutch.

According to FIG. 1 of the drawing, the dual clutch 1 is composed essentially of a driving disk 2, of a central disk 3 connected to the latter, of pressure plates 4 and 5 provided on both sides of the central disk 3 and of friction disks 6 and 7 arranged between the central disk 3 and the pressure plates 4 and 5.

The driving disk 2 is seated fixedly in terms of rotation on the input shaft 8 of the dual clutch 1 and consequently rotates with said input shaft at the same rotational speed. The input shaft 8 is normally the drive shaft or crank shaft of an engine, not illustrated in the drawing.

The driving disk 2 is connected via a clutch body 13 to the central disk 3, that is to say the central disk 3 rotates at the same rotational speed as the driving disk 2. The pressure plates 4 and 5 arranged on both sides of the central disk 3 rotate with the central disk 3, but can be displaced axially in relation to the central disk 3.

The friction disks 6 and 7 are connected fixedly in terms of rotation in each case to a clutch output shaft 10 and 11, specifically the friction disk 7, illustrated on the right in the drawing, to a hollow shaft 11 and the friction disk 6, illustrated on the left in the drawing, to a solid shaft 10 led through the hollow shaft 11. The central disk 3 is supported on the hollow shaft 11 via a clutch bearing 21 and a cardanic run-on disk 18 and is freely movable radially.

To trigger the clutch action, one of the pressure plates 4 and 5 is moved in the direction of the central disk 3, with the result that the respective friction disk 6 or 7 is pressed firmly onto the central disk 3. As a result of the coupling of the respective friction disk 6 or 7, the latter rotates with the central disk 3 and transfers the engine torque to the respective clutch output shaft 10 or 11.

The clutch output shaft 10, which is designed as a solid shaft and can be connected to the friction disk 1, 6 illustrated on the left in the drawing, issues into a transmission housing, not illustrated in the drawing, where it serves for driving a first subtransmission. This subtransmission operates, for example, the gears 1, 3 and 5.

The clutch output shaft 11, which is designed as a hollow shaft and can be connected to the friction disk 2, 7 illustrated on the right in the drawing, surrounds the solid shaft 10. In the same way as the solid shaft 10, the hollow shaft 11 also leads into the transmission housing, not illustrated in the drawing, and serves for driving a second subtransmission which is intended, for example, for the gears 2, 4, 6 and R.

Axial nonuniformities between the driving disk 2 and the central disk 3 are compensated by means of a leaf spring system 12. Radial compensation takes place as a result of the radial play between the central disk 3 and the cardanic run-on disk 18 which is connected to the central disk 3 via a cardanic articulation 17.

The friction disks 6 and 7 are connected to the corresponding clutch output shafts 10 and 11 via serrations 22 and 23. The second damper stage 14 and the third damper stage 15 are provided between the friction disks and the serrations.

Another exemplary embodiment of a dual clutch 20 is illustrated in FIG. 2a of the drawing. The main constituents of this dual clutch 20 are for the most part identical to the dual clutch 1 illustrated in FIG. 1, therefore the same reference numerals have been used for the same parts. In this embodiment, too, the driving disk 2 is connected to the central disk 3 and pressure plates 4 and 5 are provided on both sides of the central disk 3. Friction disks 6 and 7 are arranged between the central disk 3 and the pressure plates 4 and 5.

The driving disk 2 is seated fixedly in terms of rotation on the input shaft 8 of the dual clutch 20 and consequently rotates with said input shaft at the same rotational speed. The driving disk 2 is in this case connected to the central disk 3 via a torsion damper 9.

The central disk 3 is guided radially and supported axially on the hollow shaft 11 via a clutch bearing 21.

In this exemplary embodiment, too, the friction disks 6 and 7 are mounted on the clutch output shafts 10 and 11 via serrations 22 and 23 and the pressure plates 4 and 5 and the central disk 3 rotate with the driving disk 2 which is seated on the input shaft 8. As a result, for example in the exemplary embodiment illustrated in FIG. 1, in view of the given manufacturing tolerances, oblique positions of the friction disks 6 and 7 with respect to the central disk 3 and to the pressure plates 4 and 5 could occur. In order to counteract this, in the exemplary embodiment according to FIG. 2 a pilot bearing 24 is provided which centers the two clutch output shafts 10 and 11, together with a hollow-shaft or solid-shaft bearing system 25, with respect to the transmission input shaft 8. This measure not only contributes to compensating the mass nonuniformities, but also compensates clutch torque nonuniformities, so that partial friction lining overheating and an accompanying destruction of the friction lining are prevented. The mounting of the transmission is also simplified considerably on account of this pilot bearing and because of the decoupling of the clutch system 20 from the driving disk 2.

Figure 2B:
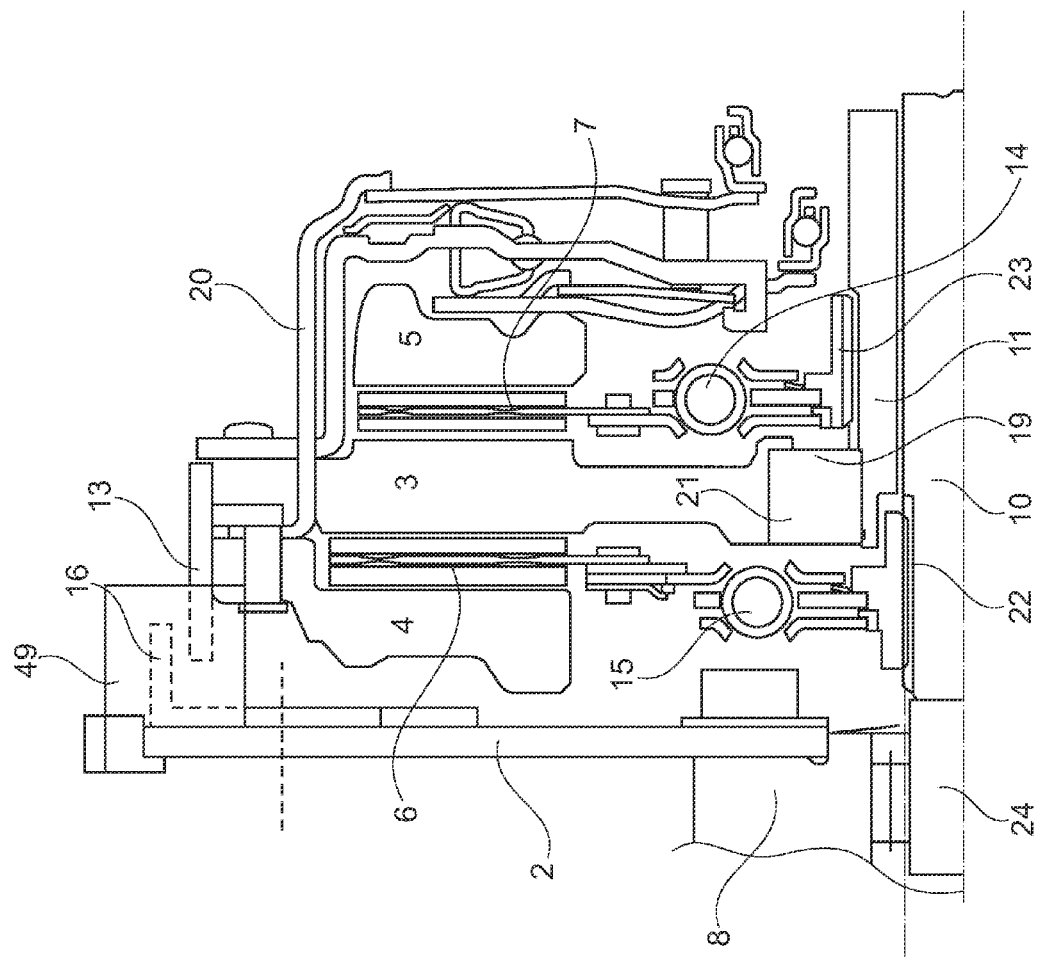
FIG. 2b shows the same section through a third exemplary embodiment of a dual clutch of novel design with three damper systems and with a pilot bearing.

FIG. 2b shows the same section as FIG. 2a through a further, novel exemplary embodiment of a dual clutch of novel design with three damper systems or damper stages and with a pilot bearing. Here, too, in this variant the central disk 3 is decoupled from the driving disk and is mounted on the hollow clutch output shaft 11 via the clutch bearing 19.

In order to improve slip-controlled insulation via the clutch, this design proposes a three-stage damper system with a first damper stage 49, connected to the central disk 3 and in combination with the two variants presented under FIG. 1 and FIG. 2, and:

a) the central disk 3 mounted fixedly on the clutch output shaft 11 and with a first damper clutch or second damper stage 14 and/or the second damper clutch or third damper stage 15; or b) the central disk 3 coupled fixedly to the driving disk 2 and with a first damper clutch 2 or second damper stage 14 and/or second damper clutch or third damper stage 15.

This damping system may be designed as an energy accumulator system (torsion damper) or as an energy absorption system (via energy absorbers. The aim here is to reduce the amplitudes of the torsional nonuniformities of the engine upstream of entry into the clutch system.

FIG. 2b shows, furthermore, the first damper stage 49 which is integrated into the driving disk 2. The driving disk 2 is connected with a form fit via a clutch body 16 to the engine side and to the clutch body 13 on the opposite transmission side of the damper stage 49. The clutch body 13 is, in turn, seated firmly on the central disk 3. The clutch body 16 is connected fixedly to the driving disk 2 and is centered in relation to the latter. The advantage of this is that two-stage or multistage/single-mass or two-mass damping systems may also be used as a backup to slip control.

The overall damping for a respective drive train of the dual clutch transmission is composed of the following stages:

1) of the first damper stage 49 implemented by the damping system 49 upstream of the central plate, case 1: no clutch slip, and the second and third damper stages 14 and 15 connected in series downstream of the friction disk, 2) of the first damper stage 49 implemented by the damping system 49 upstream of the central plate, case 2: no clutch slip, and the second and third damper stages 14 and 15 connected in series downstream of the friction disk.

In this case, the first damper stage and also the second and third damper stages may also be of two-stage design, in which case the first damper stage may be designed as a single-mass or two-mass flywheel, thus giving rise to a three-mass or two-, three- or four-stage damping system. There is also the possibility of installing targeted damping for the gears 1, 3, 5 and, independently, for the gears 2, 4, 6. Furthermore, selectively, either the first damper stage may be used for the high torque range and the second damper stage for the low torque range, or else vice versa. Slip control is in this case used only when the damper system or the damper stage cannot insulate effectively.

The advantages of this system are firstly optimal insulation in the low torque range of the engine, secondly a drastic reduction in the clutch slip and therefore also an improvement in transmission efficiency and a reduction in the clutch surface temperature and therefore a reduction in the clutch friction coefficient, thirdly a lowering of lining wear and fourthly optimal insulation against torsional nonuniformities which are generated upstream/within and downstream of the clutch system.

However, the installation of these damper stages requires that a cardanic connection system with axial prestressing and radial damping between the driving disk and the central plate, as described here in this invention, is installed, specifically for the version in which the central disk 3 is mounted on the hollow shaft 11.

Figure 3:
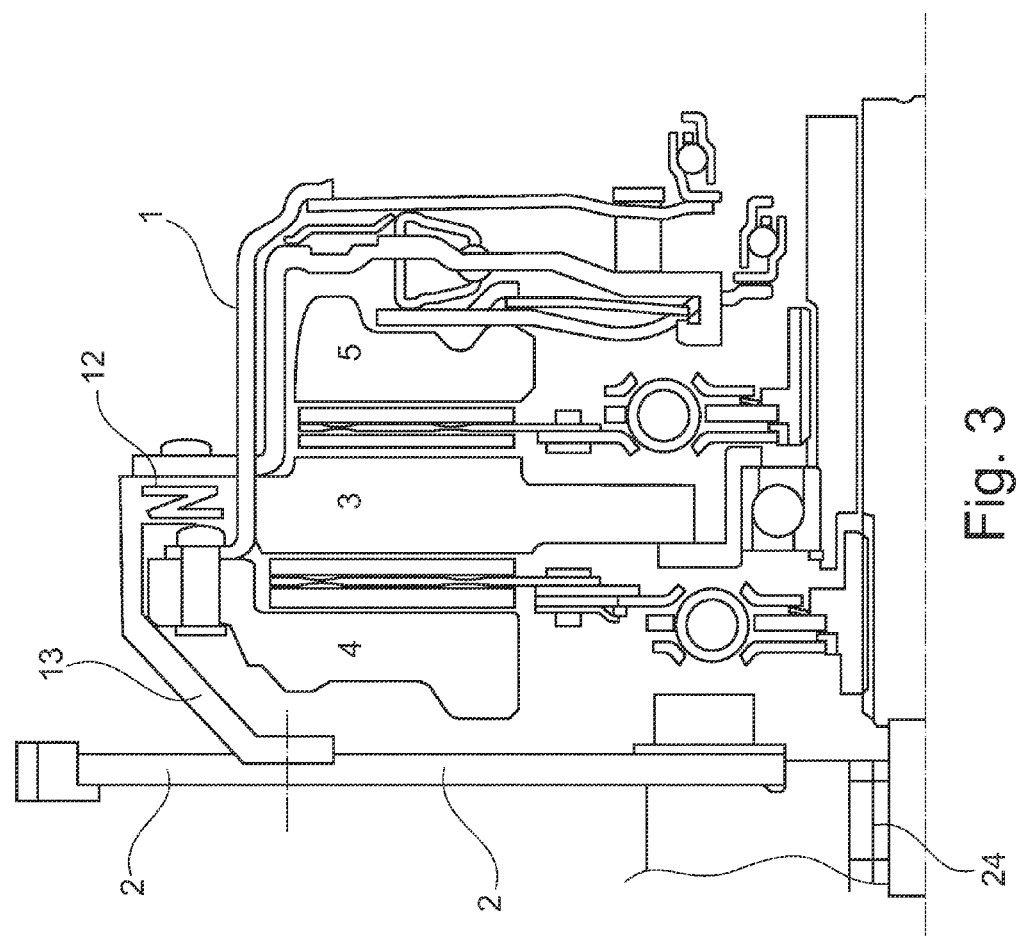
FIG. 3 shows the same section through a dual clutch according to FIG. 1 with a pilot bearing.

FIG. 3 in the drawing illustrates a further variant of the dual clutch 1, this embodiment, too, being provided with the pilot bearing 24 between the transmission input shaft 8 and the clutch output shaft 10 designed as a solid shaft. By virtue of this measure, the clutch output shafts 10 and 11 are oriented with respect to the transmission input shaft 8 and wobbling of the two clutch output shafts 10 and 11 in the event of bearing failures is counteracted. This measure also contributes to aligning the friction disks by the alignment of the solid shaft and hollow shaft via the pilot bearing, so that clutch torque non-uniformities resulting from this are also compensated, and partial friction lining overheating and an accompanying destruction of the friction lining are prevented.

FIG. 4 illustrates again a dual clutch 1 which corresponds essentially to the set-up of the dual clutch illustrated in FIGS. 1 and 3. This embodiment, too, again contains the pilot bearing 24.

Figure 4:
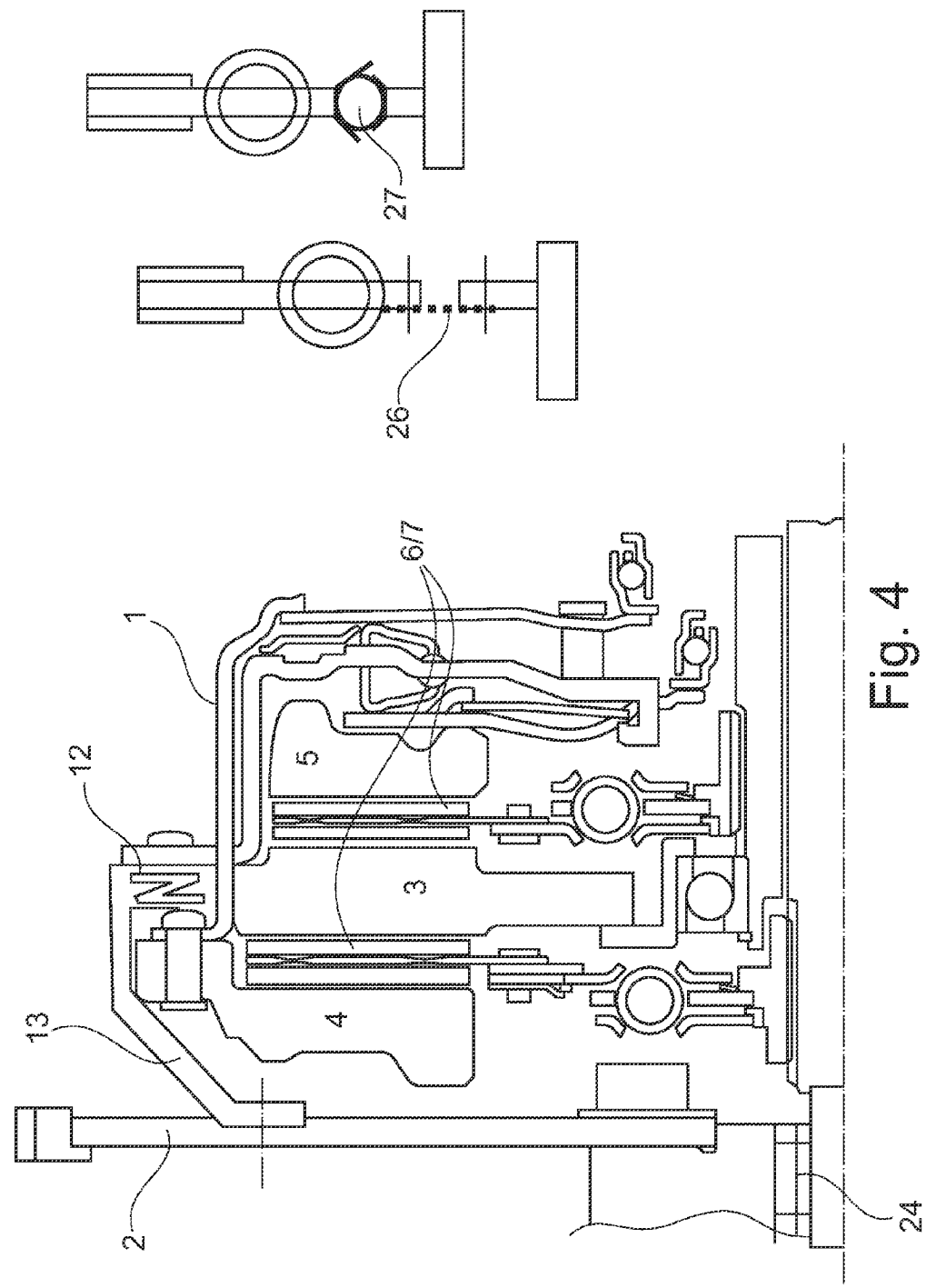
FIG. 4 shows the same section through a dual clutch according to FIG. 3, combined with a flexible or cardanic friction disk connection.

In this exemplary embodiment illustrated in FIG. 4, two further measures for the reduction of torque nonuniformities on the clutch output shafts are provided.

The first measure involves providing a flexible disk 26 between the friction disk (1, 2) 6 and 7 and the serrations 22 and 23.

The advantage of this is that the axial non-uniformities originating from the clutch connection are insulated. At the same time, a possible skewing of the clutch output shafts 10 and 11 is compensated.

According to the second measure for insulating the torque nonuniformities, a cardanic connection 27 is provided between the friction disks 6 and 7 and the clutch output shafts 11 and 12. This measure has the same effect, to be precise torque insulation with respect to the clutch output shafts 10 and 11.

The measures 1 and 2 are illustrated, enlarged, on the right side of FIG. 4.

FIG. 5 illustrates a third measure. This relates to a variant of the serrations 22 and 23. In this exemplary embodiment, the tooth flanks are designed as involutes, the tooth tips being of crowned or spherical form in the axial direction of the toothings. By virtue of this measure, a clutch torque error possibly resulting from the wobbling of the clutch is minimized.

The corresponding measures may also be combined with one another in any way and can be applied to the dual clutch 1 and 20.

FIG. 6a shows a further dual clutch design with a pilot bearing 24 and with the two damper stages 14 and 15. In this variant, the central disk 3 is decoupled from the driving disk and is mounted on the hollow clutch output shaft 11 via the clutch bearing 19.

In this exemplary embodiment, the driving disk 2 may also be designed as a "flexible driving disk", in order to compensate axial movements of the engine or transmission. The tie-up of the central disk 3 to the driving disk 2 takes place via a toothed connection 50, provided on the central disk 3, and a clutch body 13 which is connected to the driving disk 2. The advantage of this dual clutch design is that clutch skewing caused by mounting onto the driving disk 2 is ruled out.

Furthermore, what is achieved by this measure is that the friction disks (1, 2) 6 and 7 are always in alignment with the central disk 3 and with the two pressure plates 4 and 5.

Figure 6B:
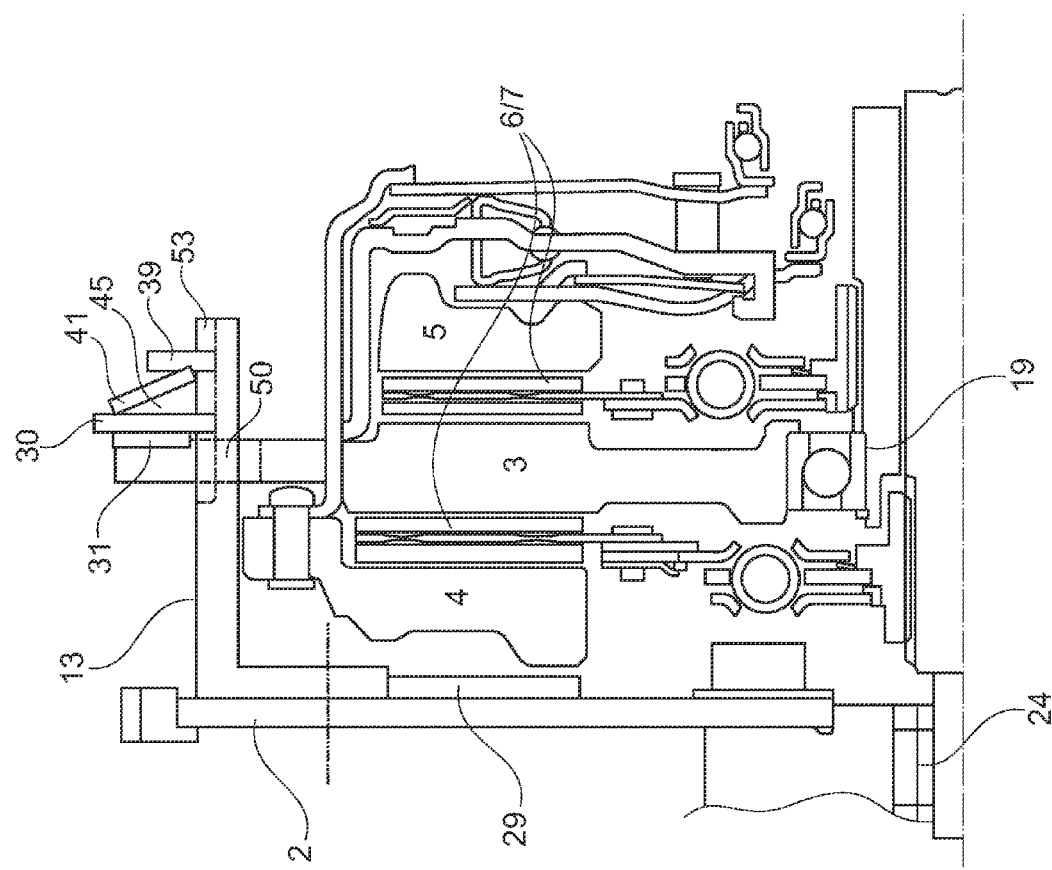
FIG. 6b shows a section through a dual clutch with a pilot bearing and with mounting of the central disk on one of the clutch output shafts, as in FIG. 6a, combined with a first axially prestressed connection system having axial play compensation and radial damping, with a spring-prestressed friction element, and at the same time prestressing of the central plate in the engine direction.

FIG. 6b shows a further dual clutch design with a pilot bearing 24 and with the two damper stages 14 and 15. In this variant, the central disk 3 is decoupled from the driving disk and is mounted on the hollow clutch output shaft 11 via the clutch bearing 19.

The tie-up of the central disk 3 to the driving disk 2 via a clutch body 13 and the corresponding toothed connection 50 corresponds to the design illustrated in FIG. 6a. In this case, a holding plate 1, 39 is connected to the clutch body 13 via an annular groove and is not displaceable axially. In order to achieve axial prestressing and radial damping, furthermore, a cup spring 41 which is prestressed axially is installed. Prestressing takes place with the mounting of the clutch body 13 onto the driving disk 2 onto a centering ring or centering diameter 29. Radial damping is generated by the axial prestressing force and the friction coefficients between the holding plate 30 and the friction system 31. Here, the holding plate 30 is connected in a toothed manner to the clutch body 13 and can be displaced axially via the toothing 53. Radial damping for the compensation of torsional nonuniformities and axial play compensation are consequently implemented. Moreover, we have here also achieved at the same time additional prestressing of the central disk in the engine direction.

Figure 6C:
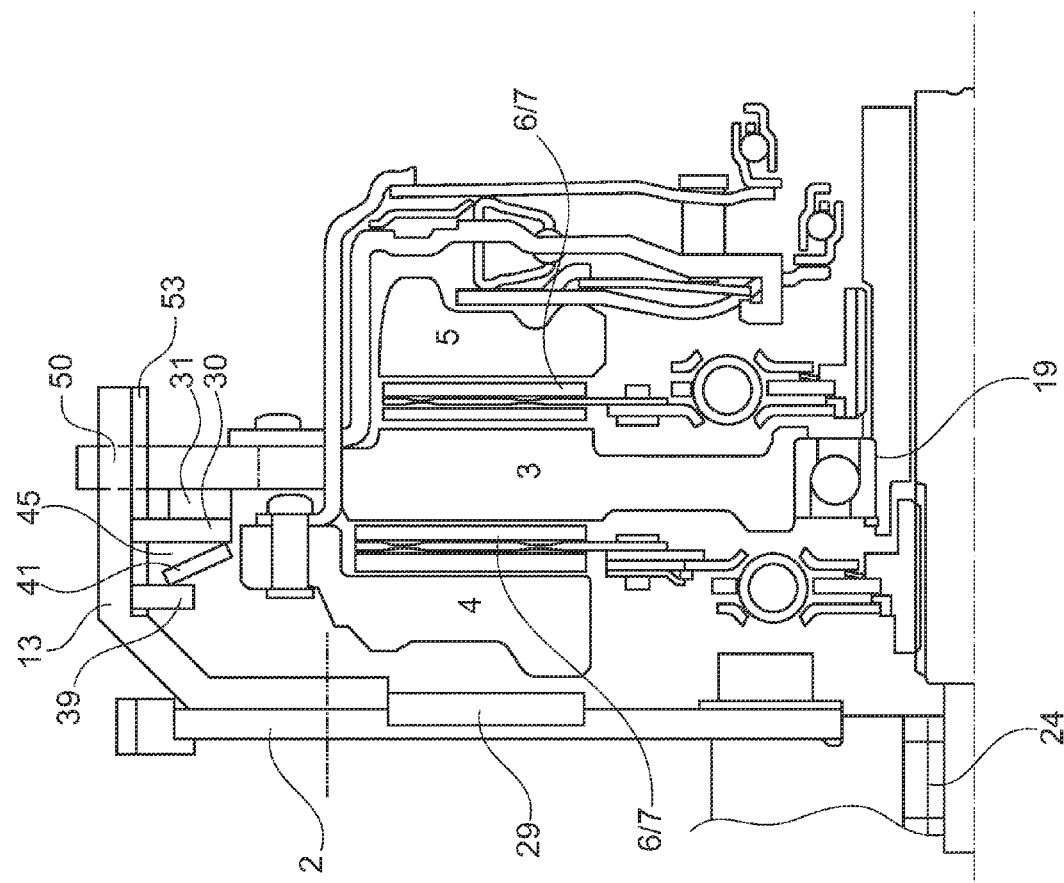
FIG. 6c shows a section through a dual clutch with a pilot bearing and with mounting of the central disk on one of the clutch output shafts, as in FIG. 6a, combined with a second axially prestressed connection system having axial play compensation and radial damping and at the same time prestressing of the central plate in the transmission direction.

FIG. 6c shows a further dual clutch design with a pilot bearing 24 and with the two damper stages 14 and 15. In this variant, the central disk 3 is decoupled from the driving disk and is mounted on the hollow clutch output shaft 11 via the clutch bearing 19, as in FIG. 6a and FIG. 6b. It shows the same spring-prestressed system as FIG. 6b, the difference being that the prestressed spring system is positioned on the engine side in relation to the central disk and causes axial prestressing of the central disk in the transmission direction. The essential advantage of this application is that there is no need, during assembly, for the clutch body 13 to be screwed to the driving disk 2. The clutch body 13 is connected fixedly to the driving disk 2. The cup spring 41, the axially nondisplaceable holding plate 39 and the holding plate 30 which can be displaced axially in the toothing 53 in the clutch body 13 are premounted in toothing in the clutch body 13. The friction element 31 may be fastened either to the holding plate 30 or on the central plate 3. Axial prestressing is implemented by the transmission housing being screwed to the engine flange and by the compression of the cup spring 41. Here, too, therefore, radial damping for the compensation of torsional nonuniformities and axial play compensation are implemented.

FIG. 6d shows a further dual clutch design with a pilot bearing 24 and with the two damper stages 14 and 15. In this variant, the central disk 3 is decoupled from the driving disk and is mounted on the hollow clutch output shaft 11 via the clutch bearing 19.

The tie-up of the central disk 3 to the driving disk 2 via a clutch body 13 and the corresponding toothed connection 50 corresponds to the designs illustrated in FIGS. 6a-6c. In this case, an axial spring system 45 with corresponding friction elements 46 and spring elements 47 is connected to the clutch body 13 and to the central disk 3. In order to achieve axial prestressing and radial damping, the prestressing of the spring system takes place with the mounting of the clutch body 13 onto the driving disk 2. Radial damping is achieved by the axial prestressing force and the resulting friction coefficients between the spring elements 47 and the friction elements 46 and also by the implementation of the freedom of radial movement of the spring system with respect to the central disk 3 and the clutch body 13. Freedom of radial movement may be achieved, for example, by means of long holes. The spring elements may have been designed as leaf springs. Radial damping for the compensation of torsional engine oscillations and axial play compensation are consequently implemented. Furthermore, as a result, additional prestressing of the central disk in the engine direction, as in the design in FIG. 6b, is also achieved at the same time.

Figure 6E:
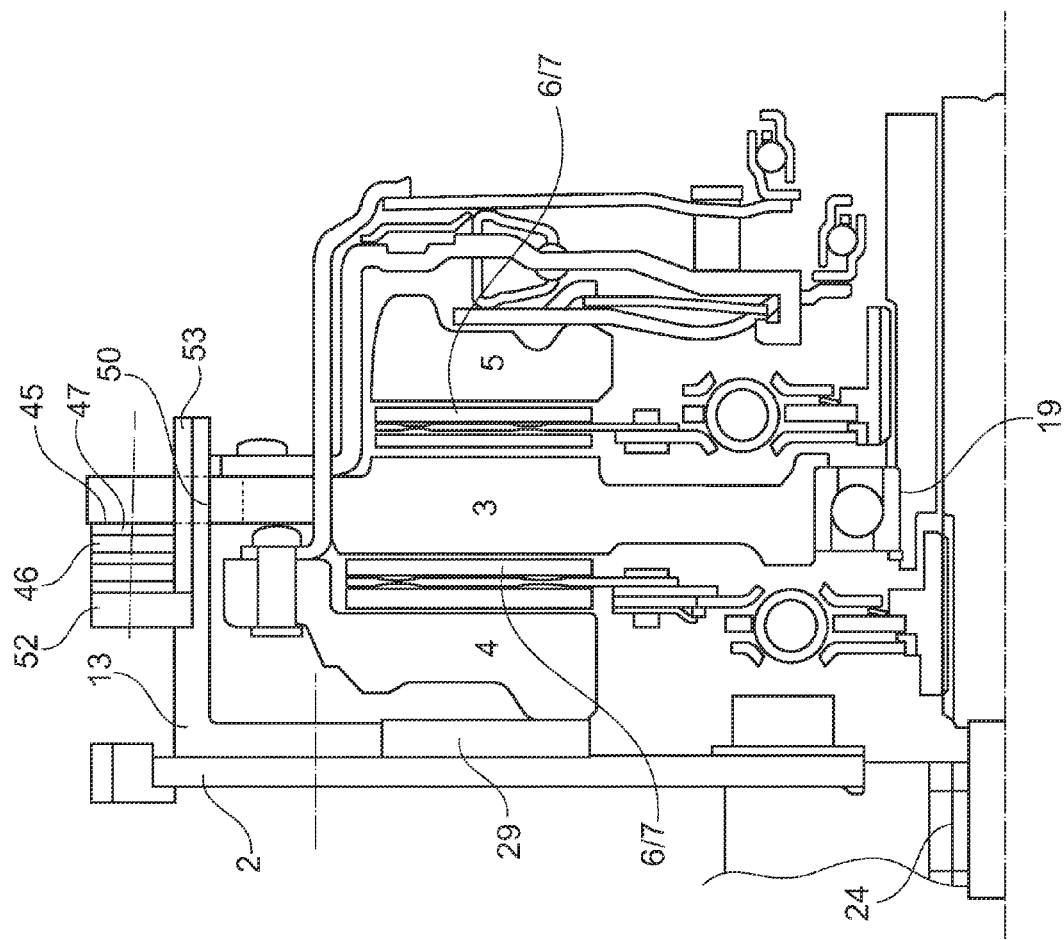
FIG. 6e shows a section through a dual clutch with a pilot bearing and with mounting of the central disk on one of the clutch output shafts, as in FIG. 6a, combined with a fourth axially prestressed connection system having axial play compensation and radial damping and at the same time prestressing of the central plate in the transmission direction.

FIG. 6e shows a further dual clutch design with a pilot bearing 24 and with the two damper stages 14 and 15. In this variant, the central disk 3 is decoupled from the driving disk and is mounted on the hollow clutch output shaft 11 via the clutch bearing 19.

FIG. 6e shows a further dual clutch design with a pilot bearing 24 and with the two damper stages 14 and 15. In this variant, the central disk 3 is decoupled from the driving disk and is mounted on the hollow clutch output shaft 11 via the clutch bearing 19, as in FIG. 6d. It shows the same spring-prestressed system 45 as FIG. 6d, the difference being that the prestressed spring system is positioned on the engine side in relation to the central disk and causes axial prestressing of the central disk in the transmission direction. The essential advantage of this application is that there is no need, during assembly, for any screwing of the clutch body 13. The clutch body 13 is connected fixedly to the driving disk 2. The spring elements 46 and the friction elements 47 may be premounted as a set either on the clutch body 13 or on the central disk. Prestressing is implemented by the transmission housing being screwed to the engine flange. In this case, the spring sets are supported on the holding ring 3, 52 which in turn is positioned positively, but axially nondisplaceably, against a limit stop in the toothing 53 of the clutch body 13. Here, too, therefore, radial damping for the compensation of torsional nonuniformities and axial play compensation are implemented.

FIG. 7 illustrates a further dual clutch design in which the tie-up of the central disk 3 to the driving disk 2 takes place via a clutch body 16, specifically via toothing and a prestressed connection. In this case, a holding ring 42 is connected to the driving disk 2. In order to achieve axial prestressing and radial damping, furthermore, a cup spring 41 which is prestressed axially and is fastened to the driving disk 2 is installed. Here, selectively, an additional friction element may also be installed between the cup spring 41 and the clutch body 16. The clutch body 16 is connected positively to the holding ring 42 via toothing 51.

Figure 8:
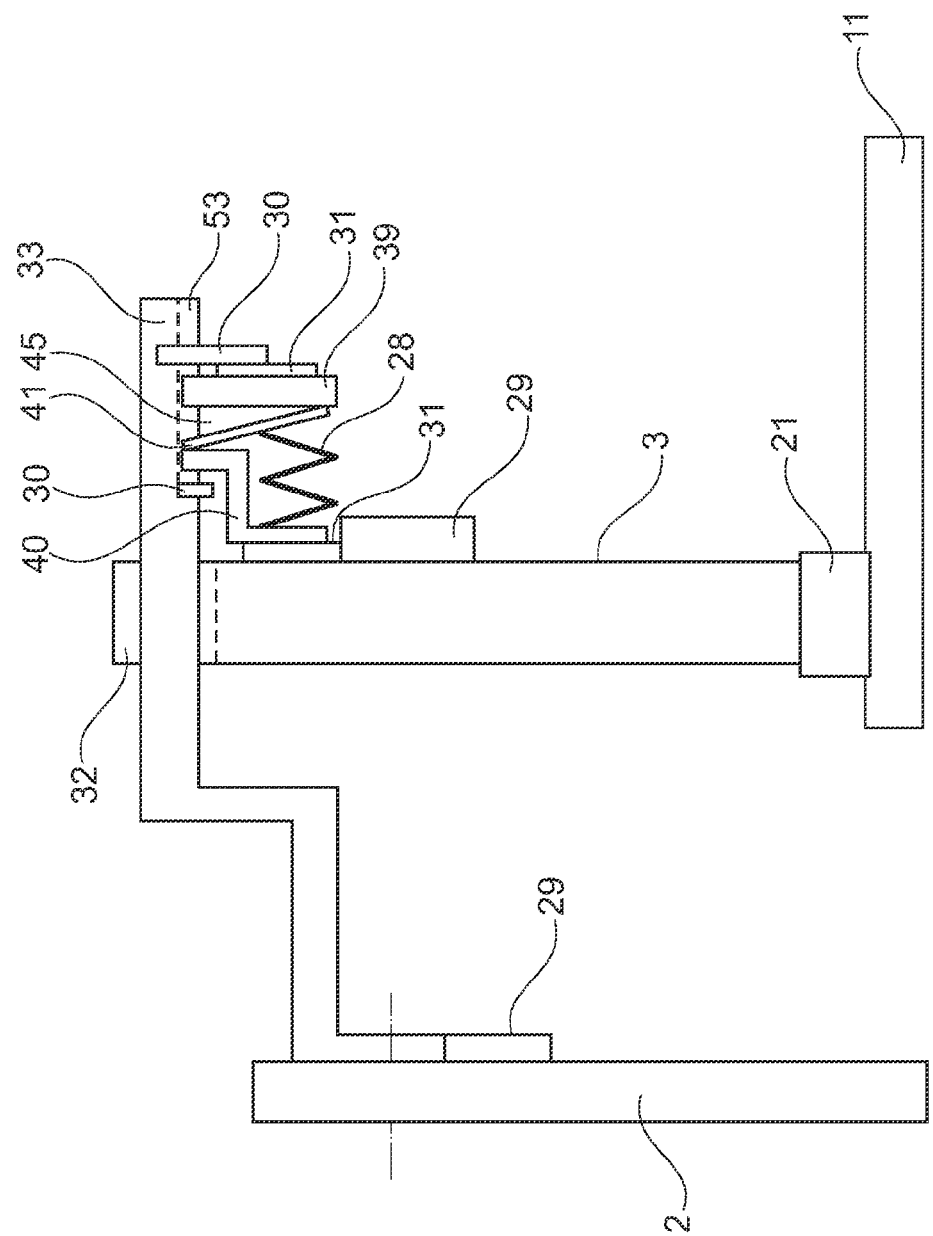
FIG. 8 shows a diagrammatic illustration of a first prestressing system with two spring-prestressed frictional connections in combination with axial play compensation on the transmission side facing away from the engine, with double radial damping and at the same time prestressing of the central plate in the engine direction.

FIG. 8 illustrates a diagrammatic illustration of a further prestressed connection device which has two spring-prestressed friction connections and does not necessitate any radial prestressing force. The friction connections act radially and therefore have a damping influence upon the serrations. In this design, the moment of friction can be set accurately and in a targeted manner by the force of an axial spring 28 or the cup spring 41 and the friction system 31. The friction system is installed in the clutch body 33 via toothing 53. During installation, the spring 28 or cup spring 41 are held and prestressed via the holding plates 30 is, via the holding plate 1, 39 and the holding ring 1, 40 which are meshed with the clutch body 33 via the toothing 53. The friction system 31 is mounted between the first holding plate 39 and the second holding plate 30 and between the central disk 3 and the first holding ring 40. The parts belonging to the friction system 31 may optionally in each case be glued on any side.

The clutch body 33 is in turn meshed positively with the central disk 3 via the toothing 32 and is connected to the driving disk 2 and is centered in each case via the centering ring 29. This prestressing system has two spring-prestressed friction connections in combination with axial play compensation on the transmission side facing away from the engine, with double radial or torsional damping and at the same time prestressing of the central plate in the engine direction. Damping serves primarily for damping during and for the bridging of the meshing clearance in the toothed connection 32 during traction/overrun operations and secondarily for the damping of torsional non-uniformities.

As a result of these measures, too, torsional nonuniformities at the central disk 3 which originate from the engine can be avoided. Skewing of the central disk 3 with respect to the friction disks 6 and 7 is thereby counteracted. A further advantage of this design is the simple installation, since the screw connection can be handled in a simple way and there is no need for lifting of the clutch onto the driving disk. For the prestressing device, it is necessary to decouple the central disk 3 from the driving disk 2 and to mount the central disk on the clutch output shaft (hollow shaft) 11 via the clutch bearing 21.

Figure 9:
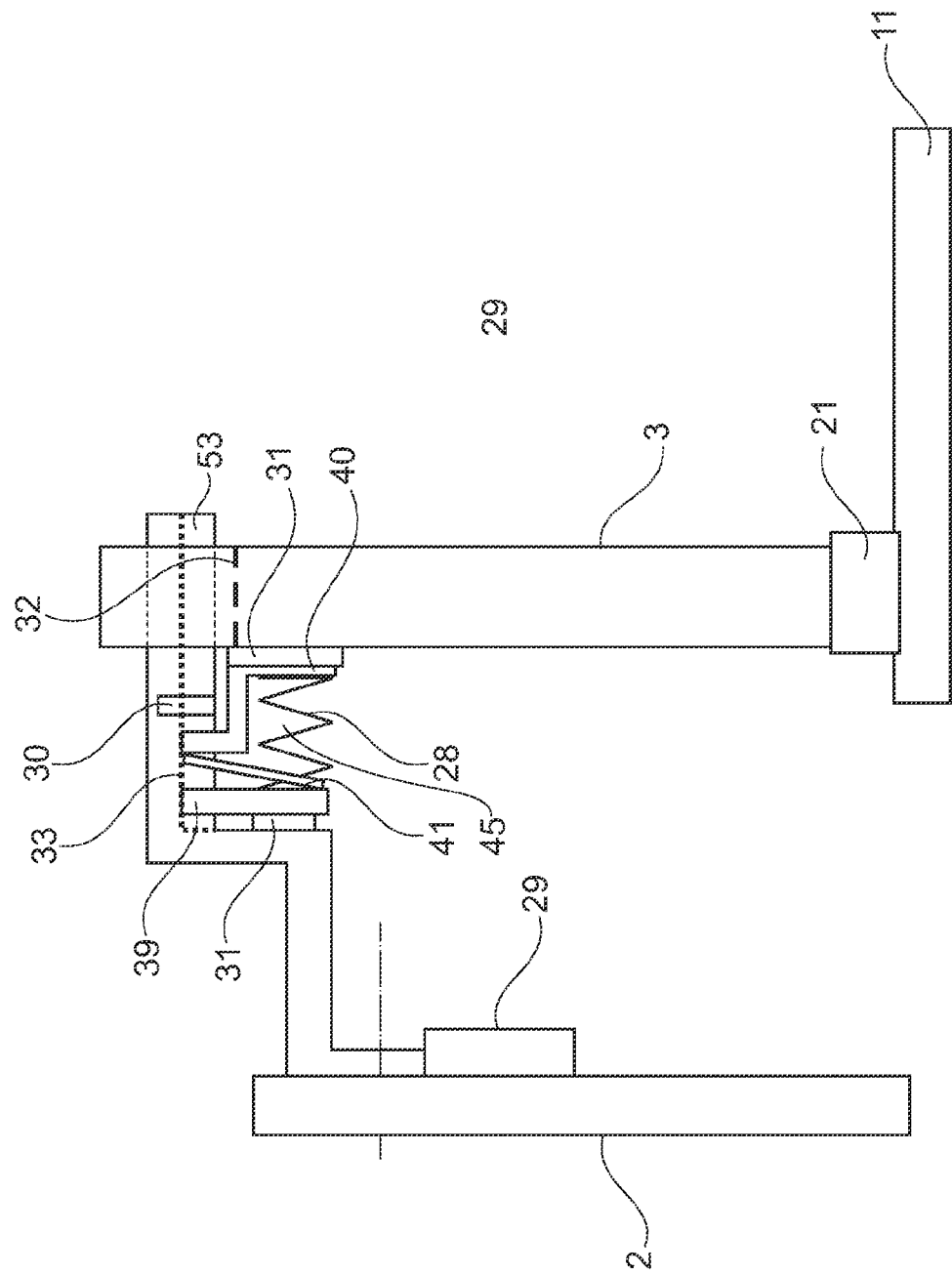
FIG. 9 shows a similar second prestressing system to that in FIG. 8, on the side facing the engine, with double radial damping and at the same time prestressing of the central plate in the transmission direction.

FIG. 9 illustrates a diagrammatic illustration of a further prestressed connection device which is designed in a similar way to the connection device in FIG. 8. In this embodiment shown in FIG. 9, however, the prestressing device is integrated completely into the second clutch body 33 and its toothing 53. In the not yet mounted state, the second clutch body 33 with the friction devices constitutes a unit which is first mounted onto the centering ring 29 of the driving disk 2. The individual elements of the friction system 31 may selectively be fixed or glued on one contact surface or the other. The clutch is mounted by means of the axial prestressing force generated by the screwing of the transmission to the engine. There is no need for a screw connection of the clutch itself during the installation of the transmission.

For the prestressing device, it is necessary to decouple the central disk 3 from the driving disk 2 and to mount the central disk 3 on the clutch output shaft 11 by means of the clutch bearing 21. This second prestressing system is similar in set-up to FIG. 8, but is equipped on the side facing the engine with double radial and torsional damping and at the same time prestressing of the central plate in the transmission direction.

Figure 10:
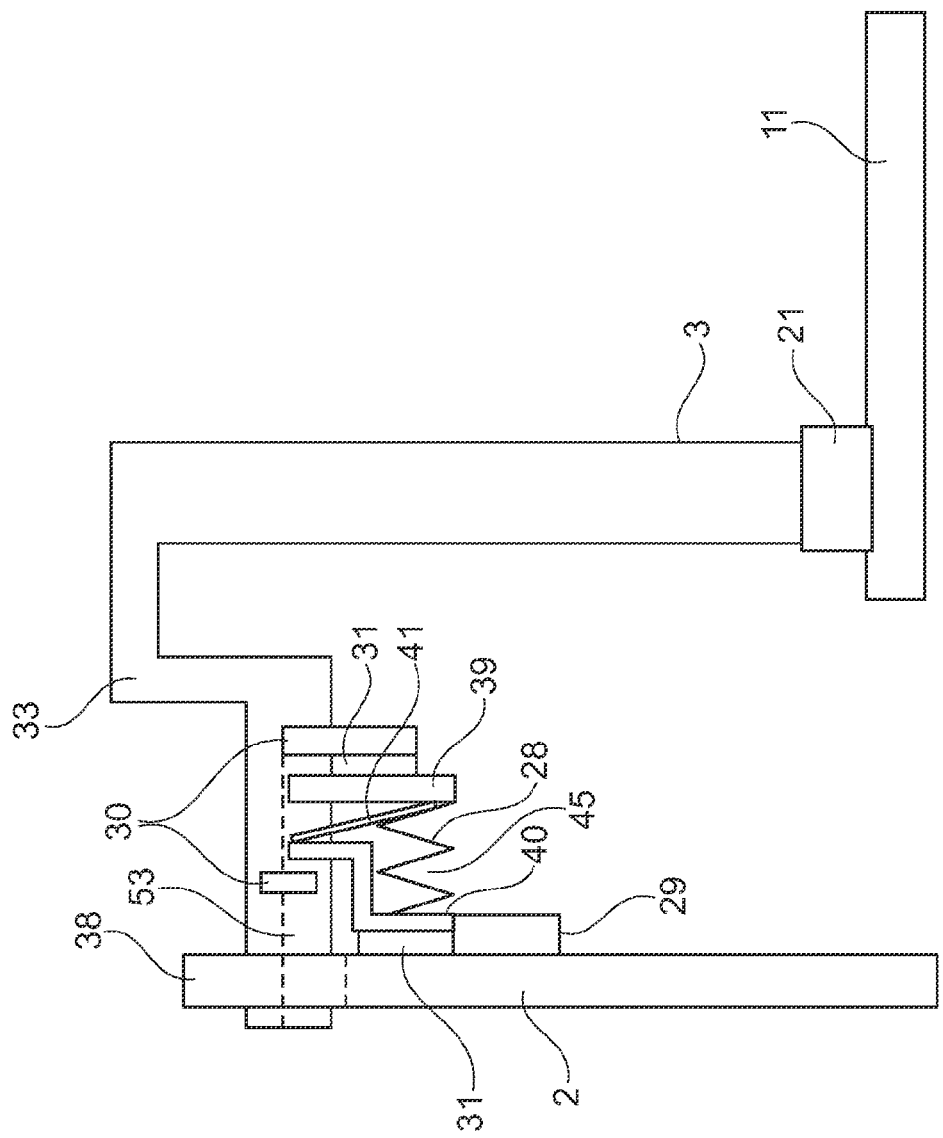
FIG. 10 shows a similar third prestressing system to that in FIG. 8, which is mounted between the driving disk and the central disk, specifically with double radial damping and at the same time prestressing of the central plate in the transmission direction.

FIG. 10 shows a diagrammatic illustration of a further prestressed connection device which is designed in a similar way to the device illustrated in FIG. 9, but in this exemplary embodiment the prestressing device is integrated completely into the central disk 3 and the clutch body 33 in their toothing 53. In the non-installed state, the central disk 3 with the friction device and with the clutch body 33 constitutes a premounted unit. The elements of the friction system 31 may selectively be fixed or glued on one contact surface or the other.

The axial prestressing force is implemented by the mounting of the clutch or transmission onto the engine. There is no need for a screw connection during the installation of the transmission. For this prestressing device, too, it is necessary to decouple the central disk 3 from the driving disk 2 and to mount the central disk on the clutch output shafts 11 via the clutch bearing 21.

This third prestressing system with double damping is designed in a similar way to FIG. 9 and is mounted between the driving disk and the central disk, specifically with double radial and torsional damping and at the same time prestressing of the central plate in the transmission direction.

In this case, the friction systems are seated between the driving disk 2 and holding ring 40 and the holding plate 30 and holding plate 39. The holding plate 30 toward the driving side is axially non-displaceable, whereas the holding plate 30 toward the central disk must be axially displaceable and butts against the end of the toothing 53. The holding plate 39 and holding ring 40 are meshed with the toothing 53 and axially displaceable. As shown in the versions in FIGS. 8 to 10, the cup spring 41 may optionally be meshed with the toothing 53 or be mounted so as to lie on the toothing 53.

Figure 11:
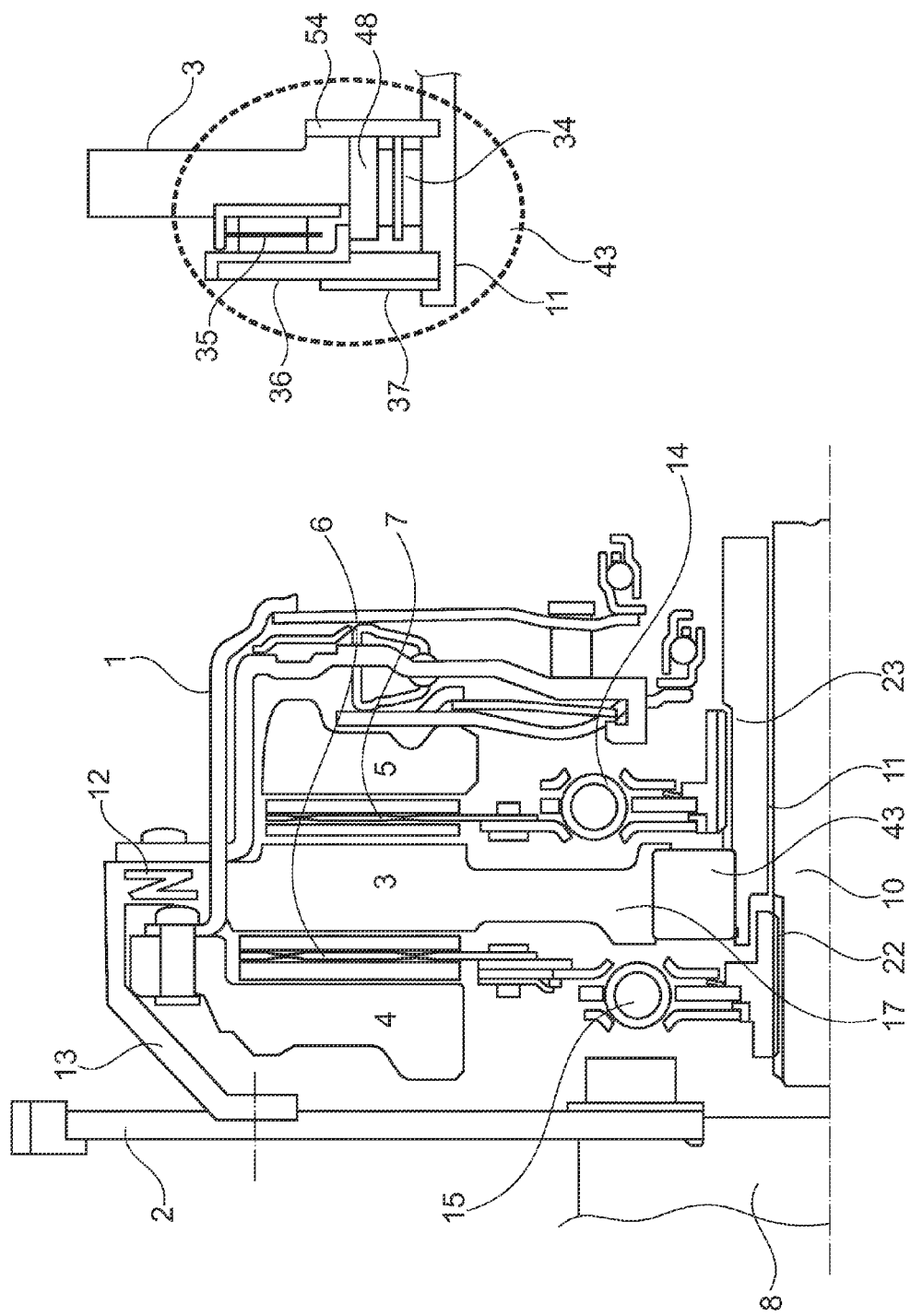
FIG. 11 shows a bearing system of the central plate with separate axial and radial support.

FIG. 11 shows a diagrammatic illustration of a clutch bearing system 43. This is composed of two needle bearing systems, specifically radial 34 and axial 35. The radial and axial needle bearing system is supported via a run-on disk 36 and is held on the hollow shaft 11 axially in the engine direction via the holding ring 37.

Here, the central disk 3 is pressed on the outer ring 48 of the radial bearing 34 and at the same time guides the axial bearing. The axial bearing 35 is provided with an inner and an outer shell and is premounted on the run-on disk 35 and guided radially within the central disk and the holding plate 36. Encapsulation of the bearing is necessary for the purpose of greasing the bearing.

The central disk 3 and outer ring 48 are supported on the holding plate 54 against the hollow shaft 11 in the direction of the transmission side. The holding plate 54 is detained axially on the hollow shaft 11 and secured. The radial bearing is encapsulated and guided radially via the hollow shaft 11 and outer ring 48 and axially via the run-on disk 36 and holding plate 54. The advantage of this is that greasing of the bearing is possible without any problems.

This proposal for the central disk mounting may be used for any of the applications of the cardanic tie-up and prestressing in the transmission or engine direction between the driving disk 2 and the central disk 3. The essential advantage of this solution of central disk mounting is improved concentricity accuracy and comprehensive prevention of axial movements or wobbling movements of the central disk 3.

Figure 12:
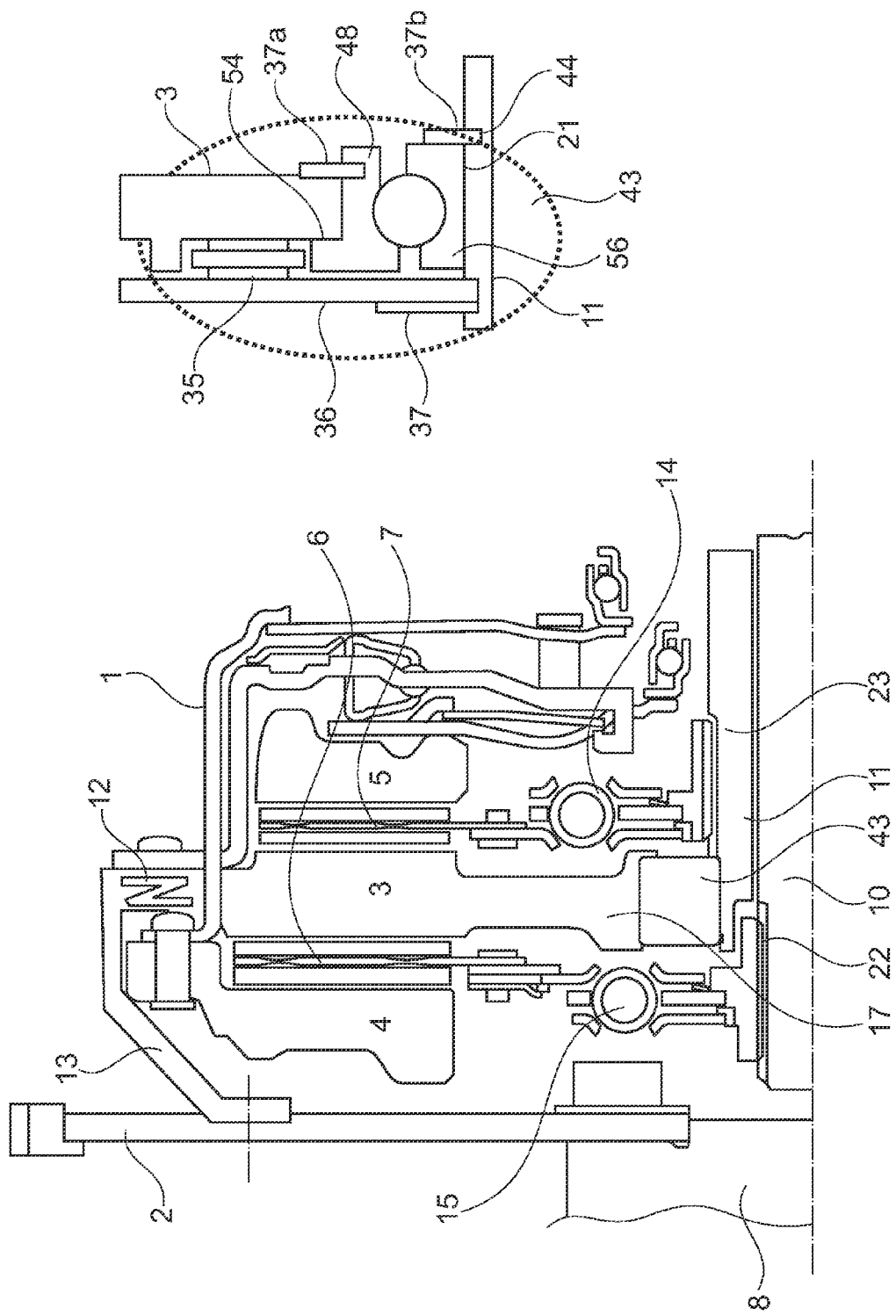
FIG. 12 shows a second bearing system of the central plate with combined radial and axial support, optionally with axial prestress.

FIG. 12 shows a diagrammatic illustration of a second clutch bearing system 43. This is composed of an axial needle bearing system 35 and of the conventional, but modified, clutch bearing 21. The axial needle bearing system is supported via a run-on disk 36 and is held and supported axially on the hollow shaft 11 via the holding ring 37. Here, the central disk 3 is pressed onto the outer ring 48 of the radial bearing and is additionally held axially on the outer ring 44 of the clutch bearing 21 via a holding ring 37a. An additional bearing shoulder 54 on the outer ring 48 fixes the central disk axially in a defined position. The inner ring 56 of the clutch bearing 21 is in turn held axially via a holding ring 37b and positioned and supported on the hollow shaft 11. The holding rings 37a and 37b may selectively also be designed as an axially prestressed cup spring system 44. Here, the axial bearing is embedded and guided radially within the central disk 3, the run-on disk 36 and the outer ring 48. This encapsulation may therefore also be used as a grease chamber.

This proposal for the central disk mounting may also be used for any of the applications of the cardanic tie-up and prestressing in the transmission or engine direction between the driving disk 2 and the central disk 3. The essential advantage of this solution in the form of central disk mounting is the comprehensive prevention of axial movements or wobbling movements of the central disk 3 and makes it possible for the central disk to be supported selectively either on the transmission side or engine side on the hollow shaft 11.

LIST OF REFERENCE SYMBOLS

1 Dual clutch
2 Driving disk
3 Central disk
4 Pressure plate

5 Pressure plate
6 Friction disk
7 Friction disk
8 Input shaft
9 Torsion damper
10 Clutch output shaft (solid shaft)
11 Clutch output shaft (hollow shaft)
12 Axial/radial spring
13 Clutch body 1
14 First damper clutch—second damper stage
15 Second damper clutch—third damper stage
16 Clutch body 2
17 Cardanic articulation of the central disk
18 Cardanic run-on disk
19 Central disk mounted on the hollow shaft 11
20 Dual clutch/system 2
21 Clutch bearing
22 Serration—clutch 1
23 Serration—clutch 2
24 Pilot bearing
25 Bearing system hollow shaft/solid shaft
26 Flexible plate
27 Cardanic connection
28 Axial spring system
29 Centering ring or centering diameter
30 Holding plate
31 Friction system
32 Toothing central disk
33 Clutch body 2 with toothing
34 Radial needle bearing
35 Axial needle bearing
36 Run-on disk axial bearing
37 Holding ring hollow shaft
37a Holding ring—central disk/clutch bearing
37b Holding ring—clutch bearing/hollow shaft
38 Toothing driving disk with clutch body
39 Holding plate 1
40 Holding ring 1
41 Cup spring
42 Holding ring 2
43 Clutch bearing system
44 Holding ring designed as a cup spring
45 Axial spring system
46 Friction element
47 Spring element
48 Outer ring radial bearing
49 First damper stage
50 Toothing central disk with clutch body
51 Toothing clutch body with holding ring
52 Holding ring
53 Toothing system
54 Holding ring
55 Bearing shoulder
56 Inner ring In accordance with the provisions of the patent statutes, the preferred embodiment has been described. However, it should be noted that the alternate embodiments can be practiced otherwise than as specifically illustrated and described.

The invention claimed is:

1. A dual clutch for a transmission, comprising;
a driving disk;
a central disk connected to the driving disk;
first and second outer pressure plates;
a first friction disk located between the central disk and the first pressure plate and a second friction disk located between the central disk and the second pressure plate, each configured to be coupled individually to the central disk and to transfer torque selectively to a respective one of first and second clutch output shafts;
the central disk being resiliently decoupled from the driving disk and mounted on one of the clutch output shafts; and
first, second and third damper stages, wherein the damper stages include an energy absorption system and an energy accumulator system for reducing amplitude of torsional non-uniformities input into the driving disk.

2. The dual clutch as claimed in claim 1, further comprising a damper system located between the friction disks and the clutch output shafts.

3. The dual clutch as claimed in claim 1, further comprising a positive connection system including a toothing system located between the central disk and the driving disk.

4. The dual clutch as claimed in claim 3, further comprising an axially prestressable spring system providing a cardanic connection having radial damping and axial play compensation between the driving disk and the central disk for compensating for axial and radial non-uniformities between the driving disk and the central disk within the toothing systems.

5. The dual clutch as claimed in claim 4, wherein the spring system is prestressed axially and is integrated either in one of the central disk, driving disk and a clutch body mounted fixedly on the driving disk or central disk.

6. The dual clutch as claimed in claim 4, wherein the spring system is positioned between the driving disk and the central disk.

7. The dual clutch as claimed in claim 4, wherein the spring system includes at least one radial friction pairing.

8. The dual clutch as claimed in claim 7, wherein radial friction pairings of the spring system are implemented selectively by one of the spring system and the central disk, and the spring system and the driving disk.

9. The dual clutch as claimed in claim 4, further comprising a clutch body for prestressing the spring system, the clutch body being assembled onto the driving disk.

10. The dual clutch as claimed in claim 4, wherein the spring system is positioned farther from the driving disk than the central disk.

11. The dual clutch as claimed in claim 1, further comprising a cardanic articulation that includes a nonprestressed toothing arranged between the central disk and the driving disk, for the compensation of radial and axial nonuniformities between the driving disk and the central disk.

12. The dual clutch as claimed in claim 1, further comprising:
serrations on the first and second clutch output shafts, the friction disks being connected to respective ones of the clutch output shafts by the serrations;
a flexible disk arranged between one of the first and second friction disks and the corresponding serrations.

13. The dual clutch as claimed in claim 1, further comprising:
serrations connecting the friction disks to the clutch output shafts; and
a cardanic connection on one of the friction disks located between the pressure plates and the serrations.

14. The dual clutch as claimed in claim 1, wherein:
the friction disks are driveably connected to respective ones of the clutch output shafts via serrations, and
a cardanic connection and a flexible disk are arranged between the friction disks and the serrations.

15. The dual clutch as claimed in claim 1, wherein:
the friction disks are driveably connected to respective ones of the clutch output shafts via serrations, and the serrations are crowned in an axial direction at tooth tips of the serrations.

16. The dual clutch as claimed in claim 1, further comprising a pilot bearing located between a clutch input shaft drivingly connected to the driving disk and one of the clutch output shafts.

17. The dual clutch as claimed in claim 1, wherein the central disk includes an axial bearing mounting and a separate radial bearing mounting and the central disk is fixed axially on one of the clutch output shafts, such that the central disk is prestressed in an axial direction toward or away from the driving disk.

18. The dual clutch as claimed in claim 1, wherein the central disk includes an axial bearing mounting and is pressed on an outer ring of a clutch bearing and is axially fixed, and
  an inner ring of the clutch bearing is fixed axially on one of the clutch output shafts, such that the central disk is prestressed in an axial direction toward or away from the driving disk.

19. The dual clutch as claimed in claim 1, further comprising first, second and third damper stages.

20. The dual clutch as claimed in claim 19, wherein:
  the first damper stage is located between the driving disk and the central disk, and
  the second and third damper stages are separate damping stages, each operatively engaging a respective one of the clutch output shafts.

21. The dual clutch as claimed in claim 19, wherein the first damper stage is for a first torque range and the second damper stage is for a second torque range that is lower than the first.

22. The dual clutch as claimed in claim 20, wherein the first damper stage includes two-stages, and the second damper stage includes two-stages, thereby comprising a four-stage damper system.

23. The dual clutch as claimed in claim 19, wherein clutch slip provides insulation between the first damper stage and the second damper stage.

24. A dual clutch comprising:
  a driving disk drivingly engaging a central disk;
  first and second pressure plates;
  a first friction disk between the central disk and the first pressure plate;
  a second friction disk between the central disk and the second pressure plate;
  the central disk resiliently engaging the driving disk;
  three damper stages including energy absorption and energy accumulator systems for reducing amplitude of torsional non-uniformities input into the driving disk.

25. A dual clutch for a transmission, comprising:
  a driving disk;
  a central disk connected to the driving disk;
  first and second outer pressure plates;
  a first friction disk located between the central disk and the first pressure plate and a second friction disk located between the central disk and the second pressure plate, each configured to be coupled individually to the central disk and to transfer torque selectively to a respective one of first and second clutch output shafts;
  the central disk being resiliently decoupled from the driving disk and mounted on one of the clutch output shafts;
  first, second and third damper stages, wherein the first damper stage is located between the driving disk and the central disk, and the second and third damper stages are separate damping stages, each operatively engaging a respective one of the clutch output shafts; and
  wherein the first damper stage includes two-stages, and the second damper stage includes two-stages, thereby comprising a four-stage damper system.

\* \* \* \* \*